United States Patent
Murthy et al.

(10) Patent No.: US 11,165,808 B2
(45) Date of Patent: Nov. 2, 2021

(54) AUTOMATED VULNERABILITY ASSESSMENT WITH POLICY-BASED MITIGATION

(71) Applicant: VMware, Inc., Palo Alto, CA (US)

(72) Inventors: Varun Murthy, Atlanta, GA (US); Jason Roszak, Brookhaven, GA (US); Blake Ryan Watts, St. George, UT (US); Matthew Conover, Mountain View, CA (US); Arvind Ahuja, Dublin, CA (US)

(73) Assignee: VMware, Inc., Palo Alto, CA (US)

( * ) Notice: Subject to any disclaimer, the term of this patent is extended or adjusted under 35 U.S.C. 154(b) by 311 days.

(21) Appl. No.: 16/249,226

(22) Filed: Jan. 16, 2019

(65) Prior Publication Data

US 2020/0228560 A1 Jul. 16, 2020

(51) Int. Cl.
*G06F 21/00* (2013.01)
*H04L 29/06* (2006.01)
*G06F 21/57* (2013.01)
*G06F 8/65* (2018.01)

(52) U.S. Cl.
CPC ............ *H04L 63/1433* (2013.01); *G06F 8/65* (2013.01); *G06F 21/577* (2013.01); *H04L 63/0263* (2013.01); *H04L 63/20* (2013.01)

(58) Field of Classification Search
CPC ...... G06F 21/577; G06F 11/3612; G06F 8/65; H04L 63/1433; H04L 63/1441; H04L 63/1425; H04L 63/20; H04L 63/029; H04L 63/1408; H04L 63/0263

See application file for complete search history.

(56) References Cited

U.S. PATENT DOCUMENTS

| | | | |
|---|---|---|---|
| 10,341,355 B1 * | 7/2019 | Niemoller | G06F 21/566 |
| 2005/0193430 A1 * | 9/2005 | Cohen | G06F 21/577 726/25 |
| 2014/0007244 A1 * | 1/2014 | Martin | G06F 21/577 726/25 |
| 2014/0283071 A1 * | 9/2014 | Spikes | H04L 63/1441 726/23 |
| 2018/0027009 A1 * | 1/2018 | Santos | H04L 63/1433 726/25 |

* cited by examiner

*Primary Examiner* — Ghazal B Shehni
(74) *Attorney, Agent, or Firm* — Thomas | Horstemeyer LLP

(57) ABSTRACT

Disclosed are various approaches to automate vulnerability assessment implement policy-based mitigation. A plurality of vulnerability records from respective ones of a plurality of vulnerability feeds are aggregated. Each of the plurality of vulnerability records are stored in a standardized format. A plurality of enterprise-specific severity scores are generated by calculating an enterprise-specific severity score for each of the plurality of vulnerability records. Then, a web page can be created that includes at least a subset of the plurality of enterprise-specific severity scores and respective ones of the plurality of vulnerability records.

20 Claims, 5 Drawing Sheets

AUTOMATED VULNERABILITY ASSESSMENT WITH POLICY-BASED MITIGATION

BACKGROUND

Information technology (IT) departments in enterprises often face a daunting task when it comes ensuring security for the computing devices for which they are responsible. Given the variety of applications that may be installed on an individual computing device, each of which has the potential to be effected by a security vulnerability, IT departments must monitor a multitude of official and unofficial sources to keep track of current security vulnerabilities that may impact their organization. In addition, IT departments need to track which applications are installed on individual computing devices, the version of the installed application, and the configuration of the installed application, in order to determine whether any particular security vulnerability actually impacts the computing device.

Further, different vulnerabilities may impact enterprises differently. For instance, a vulnerability that is generally considered to be low-severity may be more consequential to an enterprise if the vulnerability is present on tens-of-thousands of systems than a high-severity vulnerability that only impacts one or two systems. However, without knowledge of the number of systems impacted, the types of systems impacted, and the severity of the vulnerability, it can be hard for an IT department to gauge the true impact of a security vulnerability.

Moreover, mitigation is often a haphazard process. Some vulnerabilities can be resolved through a software upgrade to a new version. Other vulnerabilities may require a change to a system configuration in order to disable access to or use of a vulnerable application if an upgrade cannot be performed (e.g., because a new version is unavailable or is incompatible with other applications used by the enterprise). Investigation and application of a mitigation strategy must often be performed on a per-vulnerability and a per-device basis.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for automating the assessment of vulnerabilities and using policies to automatically mitigate the impact of vulnerabilities on an enterprise. Vulnerability disclosures, as well as information further describing vulnerabilities, can be collected from a variety of sources. The vulnerability disclosures and information can then be parsed and stored in a standardized format in a centralized database for future reference and evaluation.

Various implementations can then analyze managed devices to see which managed devices are susceptible to each vulnerability. Statistics about the current state of managed devices can be displayed on a portal or similar web page for administrative users to review. For example, the statistics may show the severity or impact of the vulnerability, the number of vulnerable managed devices, and a score or other customized indication of the impact of the vulnerability Some implementations may also allow for the impact of vulnerable devices to be minimized through the automatic application of policies. For example, an administrative user may set a policy that all vulnerable devices should be automatically updated (e.g., through the installation of an operating system patch or the installation of an updated version of a client application). Instructions could then be sent to vulnerable devices to update themselves. As another example, an administrative user may set a policy that all vulnerable devices should disable access to functionality until an update is installed (e.g., by using a firewall to disable remote or network access to a vulnerable port or application). An additional example would be to a policy that places that managed device into a quarantine state until it is updated. Other policies may also be created to address the particular characteristics of each enterprise deployment. Moreover, some implementations may allow for one or more policies to be manually applied through an administrative web-page or portal.

Figure 1:
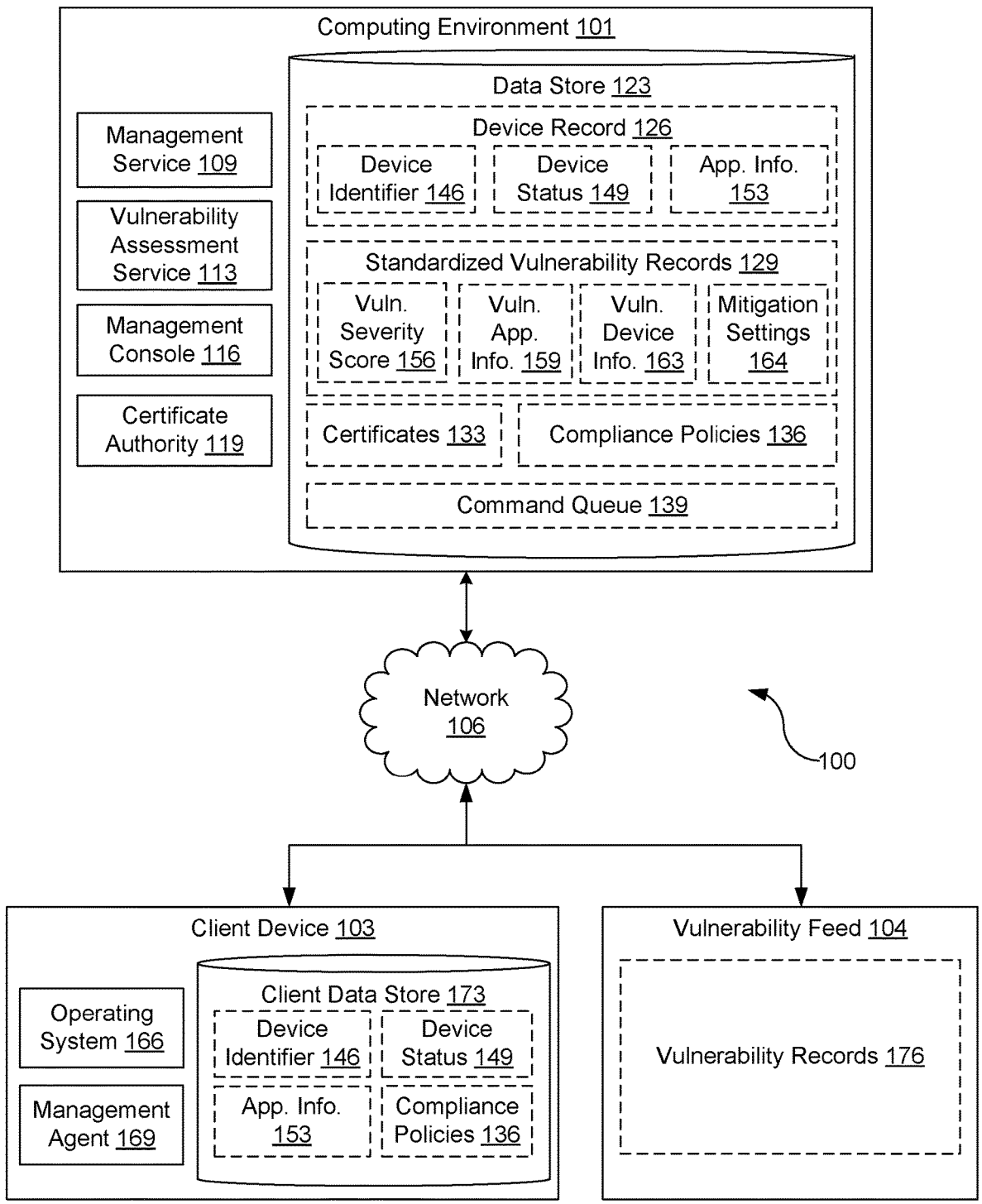
FIG. 1 is a drawing illustrating an example arrangement of a network environment according to various embodiments of the present disclosure.

As illustrated in FIG. 1, shown is a network environment 100 according to various embodiments. The network environment 100 includes a computing environment 101, a client device 103, and a vulnerability feed 104 which are in data communication with each other via a network 106. The network 106 includes wide area networks (WANs) and local area networks (LANs). These networks can include wired or wireless components or a combination thereof Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 106 can also include a combination of two or more networks 106. Examples of networks 106 can include the Internet, intranets, extranets, virtual private networks (VPNs), and similar networks.

The computing environment 101 can include, for example, a server computer or any other system providing computing capability. Alternatively, the computing environment 101 can employ a plurality of computing devices that may be arranged, for example, in one or more server banks, computer banks, or other arrangements. Such computing devices can be located in a single installation or may be distributed among many different geographical locations. For example, the computing environment 101 may include a plurality of computing devices that together may include a hosted computing resource, a grid computing resource or any other distributed computing arrangement. In some cases, the computing environment 101 can correspond to an elastic computing resource where the allotted capacity of processing, network, storage, or other computing-related resources may vary over time.

Various applications or other functionality can be executed in the computing environment 101 according to various embodiments. The components executed on the computing environment 101, for example, can include a management service 109, a vulnerability assessment service 113, a management console 116, a certificate authority 119, and other applications, services, processes, systems, engines, or functionality not discussed in detail herein.

Also, various data is stored in a data store 123 that is accessible to the computing environment 101. The data store 123 can be representative of a plurality of data stores 123, which can include relational databases, object-oriented databases, hierarchical databases, hash tables or similar key-value data stores, as well as other data storage applications or data structures. The data stored in the data store 123 is associated with the operation of the various applications or functional entities described below. This data can include one or more device records 126, one or more standardized vulnerability records 129, one or more certificates 133, one or more compliance policies 136, a command queue 139, and potentially other data.

The device record 126 can represent information about individual client devices 103 registered with or known to the management service 109. A device record 126 can be created by the management service 109 upon enrollment or registration by a respective client device 103. Accordingly, a device record 126 can include a device identifier 146, a device status 149, and application information 153. Other information about a respective client device 103 may also be stored in the device record 126 as appropriate for particular implementations.

The device identifier 146 can uniquely identifies a device record 126 for a client device 103 with respect to other device records 126 or client devices 103. For example, the device identifier 146 could include a device or machine name, a device serial number, a media access control (MAC) address of a network interface installed on the client device, an international mobile equipment identifier (IMEI) assigned to the client device, a globally unique identifier (GUID) or universally unique identifier (UUID) previously assigned to the client device 103, or other suitable identifier.

The device status 149 stored in the device record 126 can represent that current status of a registered client device 103 with respect to the management service 109. Examples of client device 103 status include a quarantined status, a registered status, a vulnerable status, a mitigated status, and potentially other states according to particular implementations. A registered status or state, for example, can indicate that the client device 103 is enrolled with the management service 109 and is permitted to access enterprise computing resources, networks, or data subject to any applicable compliance policies 136. A quarantined status or state, for example, can indicate that the client device 103 is enrolled with the management service 109, but is prohibited from accessing enterprise computing resources, networks, or data. A client device 103 could be placed into a quarantined status or state, for example, if it suffered from one or more vulnerabilities, if the client device 103 were currently infected with malware, or if the client device 103 had not yet been evaluated to determine whether the client device 103 were suffering from one or more vulnerabilities. Similarly, a vulnerable state or status could indicate that the respective client device 103 is enrolled, but is vulnerable to one or more security vulnerabilities. If the device status 149 indicates that the client device 103 is vulnerable, the device status 149 could also indicate or identify specific vulnerabilities (e.g., by referencing respective standardized vulnerability records 129). Similarly, the device status 149 may indicate that a vulnerability of the client device 103 has been mitigated. For example, the client device 103 may have been configured (e.g. due to the application of a compliance policy 136) to disable vulnerable features or functions of an installed application or block access to a vulnerable application.

In addition, the application information 153 stored in the device record 126 can represent information about different client applications installed on the client device 103. The application information 153 could include the names of applications installed on the client device 103, the versions of applications installed on the client device 103, any features of a client application on the client device 103 that are enabled or disabled, or other data. The application information 153 may be used, for example, to determine whether or not a client device 103 is suffering from a security vulnerability due to a vulnerable version of the client application being installed or the client application being installed in an insecure manner or having a vulnerable feature or functionality enabled.

A standardized vulnerability record 129 can represent a record containing information regarding a vulnerability. Vulnerabilities are often reported from multiple vulnerability feeds 104 or similar sources. Examples of vulnerability feeds 104 include the common vulnerabilities and exposures (CVE®) list provided by the MITRE® corporation, the U.S. National Vulnerability Database (NVD) maintained by the National Institute of Standards and Technology (NIST), the Vulnerability Notes Database maintained by the United States Computer Emergency Readiness Team (CERT), and other entities. Other types of vulnerability feeds 104 can include news feeds, websites, social media accounts of security researchers, and similar data sources. As the data provided by different vulnerability feeds 104 may be formatted in different manners unique to each vulnerability feed 104, and different data from different vulnerability feeds 104 may be provided regarding the same vulnerability, the information from vulnerability feeds 104 may be stored in a standardized vulnerability record 129 for uniform processing and analysis of the impact of specific vulnerabilities. Accordingly, the standardized vulnerability record 129 can include a vulnerability severity score 156, vulnerable application information 159, vulnerable device information 163, and one or more mitigation settings 164.

The vulnerability severity score 156 can represent a rating of how severe a vulnerability is. A low score may indicate that the vulnerability, if exploited, has a minimal impact on an effected client device 103. For example, a successful exploit of a low-severity vulnerability might result in the affected application merely crashing. Likewise, a high vulnerability severity score 156 may indicate that that a successful exploit would have a large impact on the affected client device 103. For example, a successful exploit of a high-severity vulnerability might permit remote administrative control or access to the client device 103 across the network 106.

The vulnerable application information 159 can represent information that can be used to identify vulnerable client applications or vulnerable versions of a client application. For example, vulnerable application information 159 could include the names of applications impacted by the vulnerability, the versions of applications impacted by the vulnerability, any features of a client application impacted by the vulnerability, or similar data. The vulnerable application information 159 may be used, for example, to identify client devices 103 that are potentially vulnerable to a respective vulnerability.

The vulnerable device information 163 can represent information about vulnerable hardware of a client device 103. In some instances, security vulnerabilities may result from defective hardware design (e.g., side-channel attacks to access data stored in memory or in a cache of a CPU) or firmware vulnerabilities. Accordingly, the vulnerable device information 163 could include the make, model, revision, version, or similar data about a hardware component or firmware that is impacted by a vulnerability.

The mitigation settings 164 may specify whether the management service 109 is to perform a mitigation action in the event that a client device 103 is determined to be subject to the vulnerability represented by the standardized vulnerability record 129. In addition, the mitigations settings 164 may specify the type of mitigation action to be performed by the management service 109. For example, the mitigation settings 164 may identify one or more compliance policies 136 to be enforced by the management agent 169 in the event that the client device 103 is vulnerable.

The certificates 133 can represent electronic documents that can certify or prove the ownership of a public key by a particular service, party, user, device, or entity. As a result, certificates 133 may be used by individual applications, client devices 103, or users in order to authenticate their identity or to encrypt communications with other applications. Certificates 133 may be formatted in various ways, such as the X.509 certificate format. Moreover, certificates 133 can be issued by a certificate authority 119 to various services, parties, users, devices, or entities, and their status (e.g., valid, revoked, etc.) can be tracked by the certificate authority 119. In some instances, however, certificates 133 may be generated by the client device 103 or the management service 109 and stored with the certificate authority 119.

The management service 109 can be executed to oversee the operation of client devices 103 enrolled with the management service 109. In some examples, an enterprise, such as a company, organization, or other entity, can operate the management service 109 to oversee or manage the operation of the client devices 103 of its employees, contractors, customers, or other users having accounts with the enterprise. The management service 109 can further cause device records 126 to be created, modified, or removed from the data store 123. Commands issued by the management service 109 for client devices 103, such as to apply settings or perform actions specified in a compliance policy 136, may be stored in the command queue 139 by the management service 109. As discussed later, the client device 103 may access the command queue 139 and retrieve and execute any commands stored in the command queue 139 for the client device 103.

The vulnerability assessment service 113 can be executed to perform various functions. For example, the vulnerability assessment service 1133 can collect information from various vulnerability feeds 104 regarding particular vulnerabilities, as well as generate and store standardized vulnerability records 129 that synthesize this information. Accordingly, the vulnerability assessment service 113 may parse, scrape, or otherwise gather appropriate information from individual vulnerability feeds 104. As another example, the vulnerability assessment service 113 can analyze a standardized vulnerability record 129 to generate an enterprise-specific severity score. The enterprise-specific severity score may reflect the impact or the relative severity of a vulnerability for a particular enterprise. For instance, an enterprise with a large number of client devices 103 that are vulnerable to a low severity vulnerability may view the low severity vulnerability as being more severe than a handful of machines that are susceptible to a high severity vulnerability. This could be because the larger number of affected machines presents a larger attack surface.

The management console 116 can be executed to provide an administrative interface for configuring the operation of individual components in the network environment 100. For example, the management console 116 can provide an administrative interface for the management service 109, the vulnerability assessment service 113, and/or the certificate authority 119. The management console 116 can also provide an interface for the configuration of compliance policies 136 applicable to client devices 103. Accordingly, the management console 116 can correspond to a web page or a web application provided by a web server hosted in the computing environment 101.

The certificate authority 119 can be executed to issue and validate cryptographic certificates. For example, the certificate authority 119 can issue cryptographic certificates to services or devices in response to a request for a certificate. The certificate authority 119 can also validate the authenticity of certificates that have been issued by the certificate authority 119. For example, an application executing on the client device 103 may request that the certificate authority 119 validate a certificate issued to a service or server with which the client device 103 is interacting.

The client device 103 is representative of a plurality of client devices that can be coupled to the network 106. The client device 103 can include a processor-based system such as a computer system. Such a computer system may be a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), a media playback device (e.g., media streaming devices, BluRay® players, digital video disc (DVD) players, set-top boxes, and similar devices), a videogame console, or other devices with like capability. The client device 103 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display may be a component of the client device 103 or may be connected to the client device 103 through a wired or wireless connection. The client device 103 can also be configured to execute various applications such as an operating system 166, a provisioning agent 169, and potentially other client applications.

The operating system 166 is system software that can be executed to manage hardware and software resources of the client device 103 and provide common services for applications executed by the client device 103. This can include facilities that identify and segregate or separate processes and resources belonging to multiple users and limiting user access to those processes and resources that belong to the user or to which the user has been granted permission. Examples of operating systems include various versions of MICROSOFT WINDOWS®, APPLE MACOS®, FREEBSD®, NETBSD®, various distributions of GNU/Linux (e.g., UBUNTU®, REDHAT®, etc.), APPLE IOS®, GOOGLE ANDROID®, and similar systems.

The management agent 169 can be executed by the client device 103 to maintain data communication with the management service 109 in order to perform various actions on the client device 103 in response to instructions received from the management service 109. In some instances, the management agent 169 can be implemented as a separate application executing on the client device 103. In other instances, the management agent 169 can be implemented as a mobile device management (MDM) framework provided by or included in the operating system 166 installed on the client device 103. The management agent 169 can be configured to contact the management service 109 at periodic intervals and request that the management service 109 send any commands or instructions stored in the command queue 139 to the management agent 1696. The management agent 169 can then cause the client device 103 to perform the commands provided by the management service 109. An example of a command could include a command to enforce a specified compliance policy 136. In such an example, the compliance policy 136 could be stored in the command queue 139 as part of the command to be retrieved by the management agent 169.

The client device 103 can also have a client data store 173 accessible to applications executing on the client device 103. The client data store 173 can include relational databases, object-oriented databases, hierarchical databases, hash tables or similar key-value data stores, as well as other data storage applications or data structures. The data stored in the client data store 173 is associated with the operation of the various applications or functional entities described below. This data can include a device identifier 146, a device status 149, application information 153, one or more applicable compliance policies 136, and potentially other data.

The vulnerability feed 104 can represent a computing device or hosted service that is accessible via the network 106. A vulnerability feed 104 can include one or more vulnerability records 176. Each vulnerability record 176 can represent a record, entry, post, or other data item containing information about a vulnerability. Examples of vulnerability feeds 104 include the common vulnerabilities and exposures (CVE®) list provided by the MITRE® corporation, the U.S. National Vulnerability Database (NVD) maintained by the National Institute of Standards and Technology (NIST), the Vulnerability Notes Database maintained by the United States Computer Emergency Readiness Team (CERT), and other entities. Other types of vulnerability feeds 104 can include news feeds, websites, social media accounts of security researchers, and similar data sources. Examples of vulnerability records 176 can include individual CVE's, NVD records, social media posts, website posts, or other items.

Next, a general description of the operation of the various components of the network environment 100 is provided. More specific and detailed descriptions of the individual components of the network environment 100 are provided in the discussion of the subsequent figures.

To begin, a client device 103 may enroll with the management service 109. For example, a management agent 169 installed on the client device 103 may connect to the management service 109 and provide authentication credentials (e.g., a username and password) to the management service 109 to authenticate the user of the client device 103 and the client device 103 itself. As part of the enrollment process, the management service 109 may create a device record 126 for the client device 103 that includes the device identifier 146, application information 153 about applications stored on the client device 103, and potentially other information provided by the client device 103 as part of the enrollment process.

In addition, a certificate 133 can be generated as part of the enrollment process, which can be provided to the client device 103 for future authentication with the management service 109. The certificate 133 can be generated by the management service 109 itself or the certificate authority 119. The certificate 133 can be provided to the client device 103 as part of a profile or compliance policy 136 sent to the client device 103 upon completion of the enrollment process. However, in some implementations, the certificate 133 can be generated by the client device 103 and provided to the management service 109 by the management agent 169 as part of the enrollment process. In these implementations, the certificate 133 may be stored by the management service 109 for future use or reference by the management service 109 or the certificate authority 119.

Meanwhile, the vulnerability assessment service 113 can periodically connect to one or more vulnerability feeds 104 and retrieve any new, updated, or otherwise relevant vulnerability records 176. The vulnerability assessment service 113 can then extract information from the vulnerability records 176 and store them in a respective standardized vulnerability record 129. In the event that the same vulnerability is reported by two or more different vulnerability feeds 104, the vulnerability assessment service 113 may reconcile or synthesize the data from the respective vulnerability records 176 to create the standardized vulnerability record 129.

Likewise, the management service 109 can also periodically determine whether one or more client devices 103 are vulnerable to individual security vulnerabilities. For example, the management service 109 may place a command in a command queue 139 for a client device 103 to cause the client device to report its updated application information 153. The management service 109 could then compare the provided application information 153 it receives from a client device 103 in response to the command with the vulnerable application information 159 provided in individual standardized vulnerability records 129. The result of the comparison could then be used by the management service 109 to update the device status 149 of a device record 126 to indicate whether a client device 103 is vulnerable to one or more vulnerabilities and potentially identify which vulnerabilities the client device 103 suffers from.

In some instances, the management service 109 may automatically attempt to secure a client device 103 that it determines to be subject to a specific vulnerability. Whether the management service 109 attempts to secure the client device 103 and how the management service 109 attempts to secure the client device 103 may be specified by one or more mitigation settings 164 in the standardized vulnerability record 129 representing the vulnerability. As an example, the management service 109 may insert a command into a command queue 139 for an impacted client device 103. The command can contain an instruction specifying that the client device 103 must update itself to a newer version of the effected program or disable a vulnerable feature of the effected program. Similarly, the command could contain a compliance policy 136 that forces the management agent 169 to disable or prevent access to a vulnerable program or program function (e.g., reconfigure a firewall on the client device to block network access to a port used by a vulnerable program). In such instances, the management service 109 may send a follow up command to the client device to receive updated application information 153 to determine whether or not the automatic update was successful.

In some implementations, however, attempts to secure devices by the management service 109 may not be automatic. For example, an enterprise may wish to test security updates for compatibility or functionality purposes prior to deploying a security update. In these implementations, the management console 116 may render in a web page or a portion of a web page an appropriate user interface to allow a user to manually initiate updates to one or more client devices 103.

Periodically, the vulnerability assessment service 113 may also calculate an enterprise-specific severity score or other, related statistics. For example, the vulnerability assessment service 113 may query the management service 109 to identify client devices 103 that are effected or suffering from a specific vulnerability. As another example, the vulnerability assessment service 113 may calculate an enterprise-specific severity score to measure the impact of a particular vulnerability on an enterprise. The enterprise-specific severity score may be based at least in part on the vulnerability severity score 156 and the number of client devices 103 that are impacted. However, in some implementations, the enterprise-specific severity score may also be adjusted to account for the type of client devices 103 that are impacted. For example, if the laptop or smartphone of the Chief Executive Officer (CEO) of an enterprise were impacted, this could weigh the enterprise-specific score towards a larger or more severe rating. This information may be surfaced to the user by a web page or similar user interface generated by the management console 116.

Figure 2:
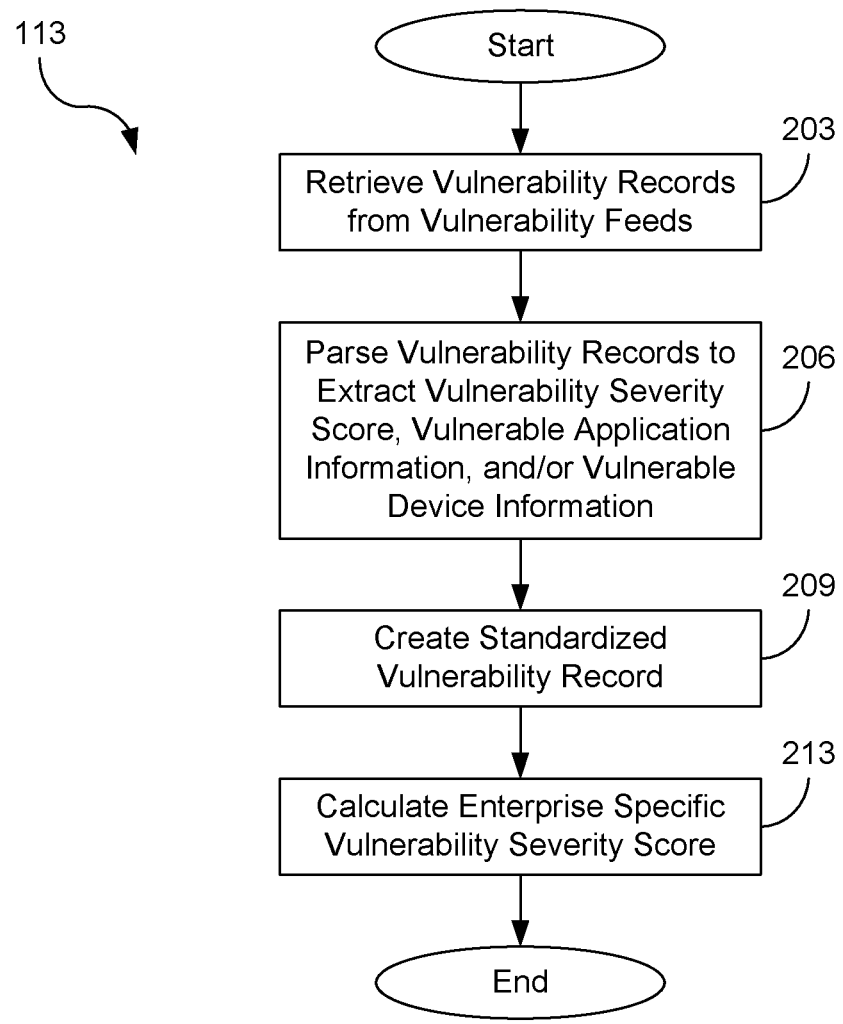
FIGS. 2 and 3 are flowcharts depicting the operation of components of the present disclosure.

Referring next to FIG. 2, shown is a flowchart that provides one example of the operation of a portion of the vulnerability assessment service 113. It is understood that the flowchart of FIG. 2 provides merely an example of the many different types of functional arrangements that may be employed to implement the operation of the vulnerability assessment service 113. As an alternative, the flowchart of FIG. 2 may be viewed as depicting an example of elements of a method implemented in the computing environment 101.

Beginning at step 203, the vulnerability assessment service 113 can retrieve a vulnerability record 176 from one or more vulnerability feeds 104 for a given vulnerability. For example, the vulnerability assessment service 113 may download or retrieve a vulnerability record 176 from a database or data source (e.g., a CVE record from MITER or an NVD record from NIST). As another example, the vulnerability assessment service 113 may scrape data related to a vulnerability from a website, social media account, news feed or similar source.

In some instances, the vulnerability assessment service 113 may retrieve multiple vulnerability records 176 describing the same vulnerability from different vulnerability feeds 104 because each separate vulnerability record 176 may include different information. For example, some vulnerability records 176 may include a vulnerability severity score 156, while others may omit this information. Likewise, some vulnerability records 176 may identify vulnerable software applications or hardware devices that others may omit. Similarly, different vulnerability records 176 provided by different vulnerability feeds 104 may provide different mitigation strategies.

Next at step 206, the vulnerability assessment service 113 can parse the retrieved vulnerability records 176 to extract relevant information. For example, the vulnerability assessment service 113 may parse a vulnerability record 176 to identify a vulnerability severity score 156. As another example, the vulnerability assessment service 113 may parse a vulnerability record 176 to identify vulnerable software applications or versions or vulnerable hardware platforms or architectures. The vulnerability assessment service 113 may also parse the vulnerability records 176 to extract or obtain additional relevant information as appropriate for particular implementations.

Then at step 209, the vulnerability assessment service 113 can create a standardized vulnerability record 129. After creating the standardized vulnerability record 129, the vulnerability assessment service 113 can store the standardized vulnerability record 129 in the data store 123. To create the standardized vulnerability record 129, the vulnerability assessment service 113 can store the vulnerability severity score 156, in the standardized vulnerability record 129. The vulnerability assessment service 113 can also store the list of affected software and software versions as vulnerable application information 159, if applicable, and the list of affected hardware platforms as vulnerable device information 163, if applicable.

Proceeding to step 213, the vulnerability assessment service 113 can, in some embodiments, calculate an enterprise-specific version of the vulnerability severity score 156. An enterprise-specific severity score can be calculated in any number of ways using a variety of factors. As a simple illustrative example, the vulnerability assessment service 113 can multiply the number of vulnerable client devices 103 by the vulnerability severity score 156 to generate an enterprise-specific severity score that represents the impact of a vulnerability on an enterprise. In this example, a handful of client devices 103 that suffer from a severe or critical vulnerability may result in a lower enterprise-specific severity score than a large number of client devices 103 that suffer from a low-risk vulnerability. This is because the large number of vulnerable client devices 103 may present a larger attack surface than a handful of vulnerable client devices 103. However, more sophisticated implementations may calculate the enterprise-specific severity score based on other factors. For example, the score may be weighted to account for the type of client device 103. To illustrate, if the personal laptop of the CEO of an organization suffers from a security vulnerability, this may be weighted more heavily than a client device 103 such as the workstation of an entry-level customer service representative.

The vulnerability assessment service 113 can determine the number of vulnerable client devices 103 in a number of ways. For instance, the vulnerability assessment service 113 can send a request to the management service 109 to identify all device records 126 of vulnerable client devices 103 and return a list of device identifiers 146 or a total number of vulnerable client devices 103. In addition to the total number of vulnerable client devices 103, the management service 109 may also include a total number of registered or enrolled client device 103.

As previously discussed, the management service 109 can identify vulnerable client devices 103 in a number of ways. For example, the management service 109 can compare the application information 153 of individual device records 126 with the vulnerable application information 159 associated with a vulnerability. Device records 126 with application information 153 that indicates that a vulnerable version of a client application is installed on the client device 103 can be included in the total number of vulnerable client devices 103. However, the management service 109 may also omit from the number of vulnerable client devices 103 those client devices 103 where the device status 149 indicates that the vulnerability has been mitigated (e.g., due to the application of a compliance policy 136 that disables a vulnerable feature or function of an application.).

Figure 3:
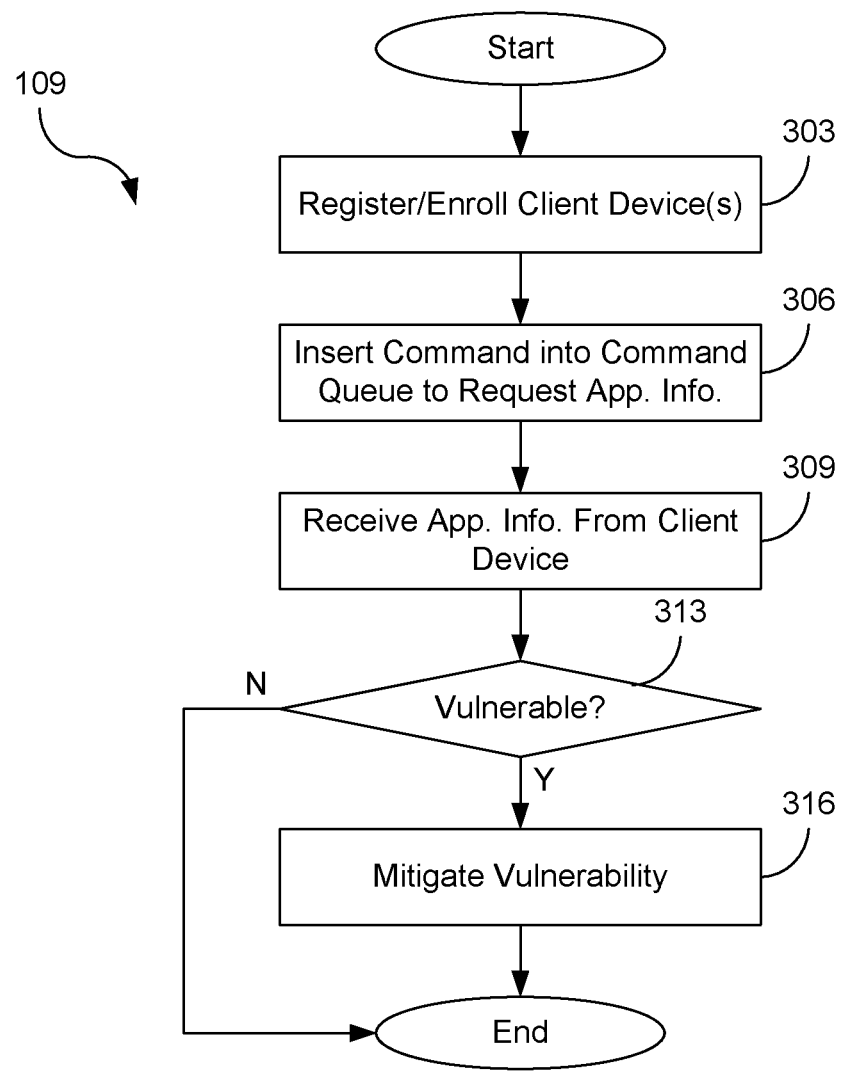

Referring next to FIG. 3, shown is a flowchart that provides one example of the operation of the management service 109. It is understood that the flowchart of FIG. 3 provides merely an example of the many different types of functional arrangements that may be employed to implement the operation of the management service 109. As an alternative, the flowchart of FIG. 3 may be viewed as depicting an example of elements of a method implemented in the computing environment 101.

Beginning at step 303, the management service 109 can register or enroll a client device 103. The registration or enrollment process can involve the management service 109 receiving authentication credentials for a user from the management agent 169 and a device identifier 146 representing the client device 103. After verifying the authentication credentials, the management service 109 may request that the certificate authority 119 issue a certificate 133 for use by the management agent 169 for future authentication with the management service 109. The certificate 133 may be sent to the management agent 169 in response. The management service 109 may also create a device record 126 to represent the client device 103, which can include the device identifier 146.

Then at step 306, the management service 109 may insert one or more commands into a command queue 139 to be retrieved and executed by the management agent 169. These commands may include a command for the management agent 169 to provide application information 153 about client applications installed on the client device 103 and potentially other information.

Next at step 309, the management service 109 can receive the application information 153 from the management agent 169. The management service 109 can then store the application information 153 in the device record 126 for the client device 103.

Moving on to step 313, the management service 109 can determine whether the client device 103 suffers from or is subject to security vulnerability. In some implementations, this step may performed periodically (e.g., every 30 minutes, every hour, every 12 hours, every day, every week, etc.). However, some implementations may provide for this step to be performed in response to a request by another application or service (e.g., a user's request submitted through the management console 116 or a query received from the vulnerability assessment service 113).

The management service 109 can identify vulnerable client devices 103 using various approaches. For example, the management service 109 may query the device record 126 to check the device status 149 of the client device 103. If the device status 149 indicates that the client device 103 is vulnerable to a particular or specified vulnerability, then the management service 109 may determine that the client device 103 is vulnerable. Alternatively or additionally, the management service 109 can also compare the current version of an application installed on the client device 103, as represented by the application information 153, to see if the current installed version is a vulnerable version of the application, as specified by the vulnerable application information 159 in a respective standardized vulnerability record 129. If the management service 109 determines that the client device 103 is not vulnerable, then the process may skip to step 319. However, in some implementations, management service 109 may proceed to step 316 if the client device 103 is determined to be vulnerable.

Proceeding to step 316, the management service 109 can automatically attempt to mitigate the vulnerability on the client device 103. For example, the management service 109 may retrieve one or more mitigation settings 164 from the standardized vulnerability record 129 for the vulnerability effecting the client device 103. The management service 109 can then perform the action or actions specified by the mitigation settings 164.

As one example, the management service 109 may insert a compliance policy 136 specified by the mitigation settings 164 into the command queue 139 for the client device 103. The compliance policy 136, when retrieved by the management agent 169, could be configured to cause the management agent 169 to perform a remedial action specified by the compliance policy 136. One example of a remedial action would be to update the vulnerable software to a newer version or to install a patch or update (e.g., a security patch for the operating system 166). Another example of a remedial action would be to disable a vulnerable feature or function of an impacted application (e.g., disable a vulnerable plugin or module of an application or disable a vulnerable operating system service). Likewise, the remedial action could be to disable access to the vulnerable service or application (e.g., reconfigure a firewall to disable access to a particular port or restrict access to a network service to a pre-approved list of interne protocol (IP) addresses). However, a compliance policy 136 may specify other remedial actions according to particular implementations.

As another example, the management service 109 may update the device status 149 to place the client device 103 into a quarantined state. When the client device 103 is in quarantined state, the management agent 169 could prevent the client device 103 from accessing network resources or executing client applications until the vulnerability is addressed.

Other mitigation approaches may also be performed in various implementations. Moreover, in some implementations, a combination of mitigation approaches may be used. Once the vulnerability has been mitigated, however, the process may end.

Figure 4:
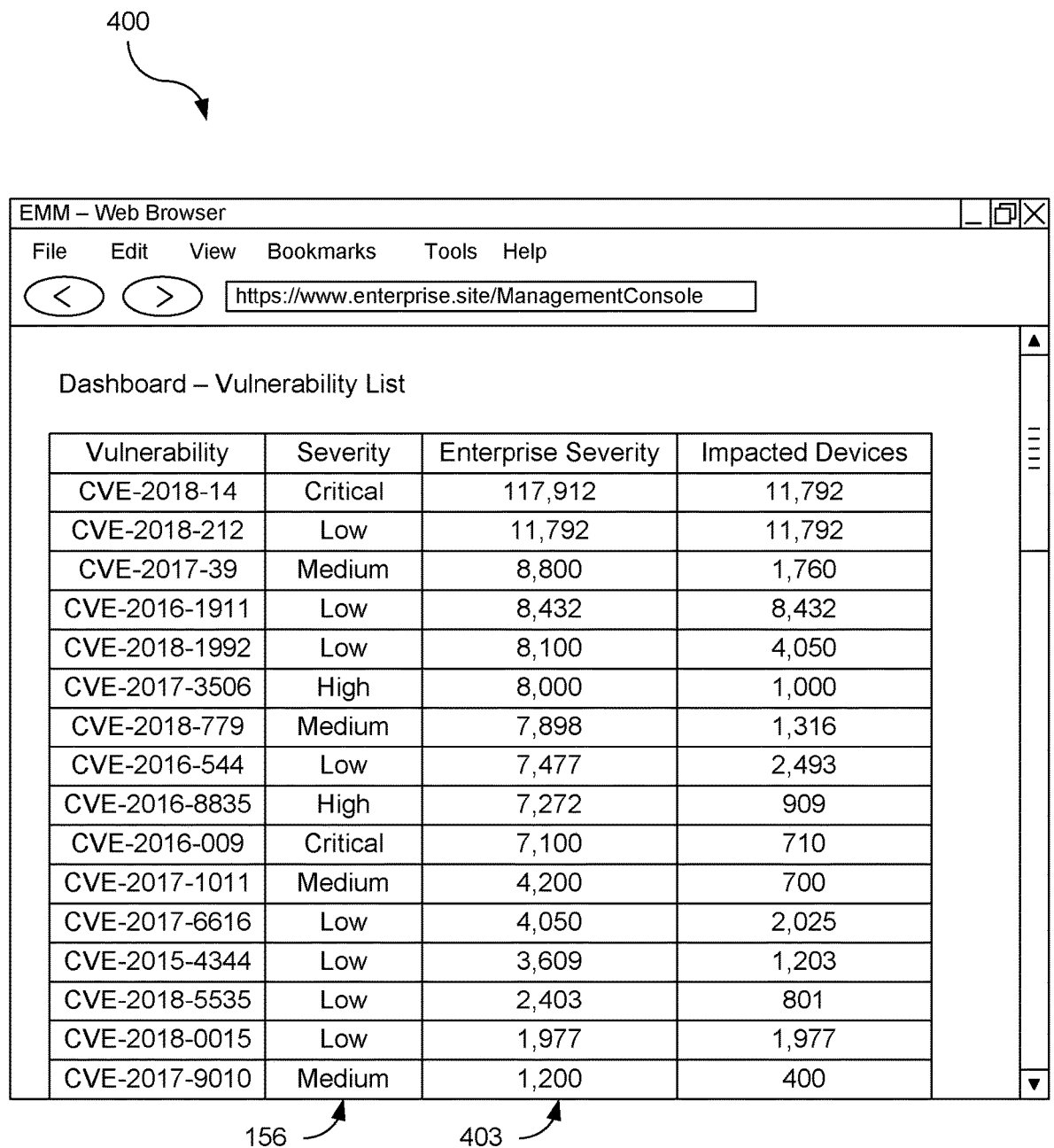
FIGS. 4 and 5 are user interface diagrams depicting various user interfaces generated by the management console in the network environment of FIG. 1.

Referring next to FIG. 4, shown is an example of a user interface, such as a web page 400, created by the management console 116. The web page 400 may be generated by the management console 116 in response to a request from a browser executing on a client device 103. Although the web page 400 provides an example of the functions that an administrative user may be provided, other arrangements or presentations may be used in various implementations.

The web page 400 depicted is one example of a portion of the functionality of a dashboard that the management console 116 may present to a user. Here, a list of vulnerabilities is presented, along with the severity rating or vulnerability severity score 156 and an enterprise-specific severity score 403. For each vulnerability, the number of client devices 103 impacted is also listed. As illustrated, the list of vulnerabilities is sorted in descending order according to the enterprise-specific severity score 403 to assist an administrative user with identifying which specific vulnerabilities are the most important to address from the perspective of the IT department.

In some embodiments, the individual elements may be manipulable by a user. For example, if a user were to select a vulnerability identifier, the user might be presented with another web page generated by the management console 116 that provides the user with a more detailed description of the vulnerability. Likewise, if a user were to select one of the column headers presented, the user might be able to alter how the information is sorted or otherwise presented to the user. For instance, a user might select "Impacted Devices" to sort the data by the number of client devices 103 that are impacted by a security vulnerability rather than by the enterprise-specific severity score 403.

Figure 5:
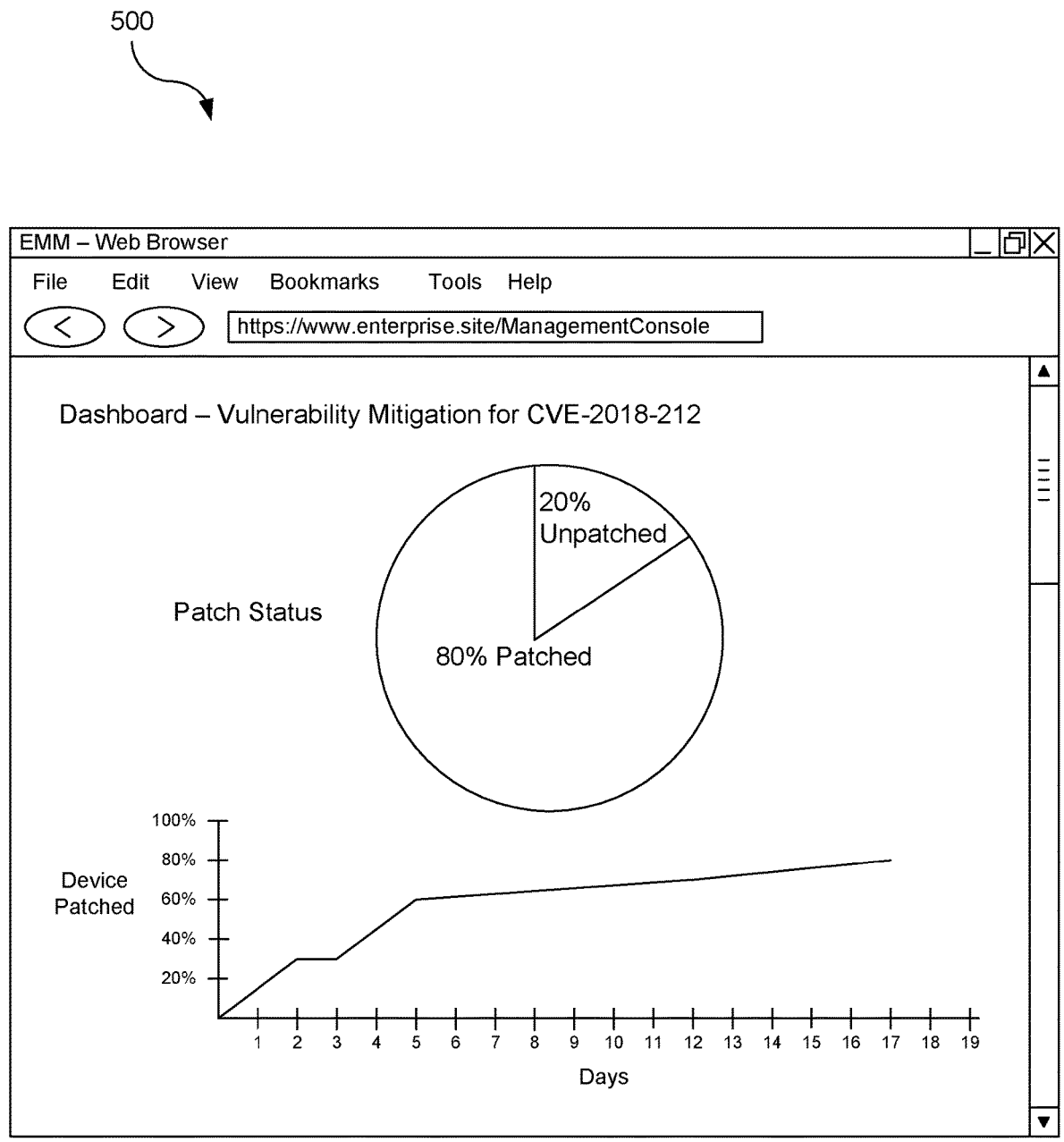

Referring next to FIG. 5, shown is an example of a user interface, such as a web page 500, created by the management console 116. The web page 500 may be generated by the management console 116 in response to a request from a browser executing on a client device 103. Although the web page 500 provides an example of the functions that an administrative user may be provided, other arrangements or presentations may be used in various implementations.

The web page 500 depicted is another example of the functionality of a dashboard that the management console 116 may present to a user. Here, the results of an enterprise's attempts to mitigate a specific vulnerability are presented. By reviewing the web page 500, an administrator could determine the percentage of client devices 103 that have been patched to address the particular vulnerability. An administrator can also see a timeline illustrating how the progress that has been made towards resolving or mitigating the vulnerability by patching or updating individual client devices 103.

While the web page 500 presents an illustration of the success of patching devices within an enterprise, a similar interface could be provided to illustrate other approaches to mitigating a vulnerability. For example, the web page 500 could illustrate the number of devices that have received a compliance policy 136 from the management service 109 and how long it has taken to reach particular milestones.

Although the management service 109, vulnerability assessment service 113, management console 116, certificate authority 119, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semi-conductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system for automatically assessing and mitigating vulnerabilities, comprising:
    a computing device comprising a processor and a memory;
    machine-readable instructions stored in the memory that, when executed by the processor, cause the computing device to at least:
        aggregate a plurality of vulnerability records from a plurality of vulnerability feeds;
        store the plurality of vulnerability records in the memory in a standardized format;
        identify a client device susceptible to a vulnerability identified by at least one of the plurality of vulnerability records by querying a device record corresponding to the client device and determining that a current version of an application installed on the client device is a vulnerable version of the application based upon the at least one of the plurality of vulnerability records;
        select a policy applicable for the at least one of the plurality of vulnerability records, wherein the policy specifies an action to be performed by the client device; and
        place the policy in a command queue associated with the client device, wherein the policy can be retrieved by the client device from the command queue.

2. The system of claim 1 for automatically assessing and mitigating vulnerabilities, wherein the machine-readable instructions, when executed by the processor, further cause the computing device to at least:
    generate a plurality of enterprise-specific severity scores by calculating an enterprise-specific severity score for each of the plurality of vulnerability records; and create a web page that includes at least a subset of the plurality of enterprise-specific severity scores and respective ones of the plurality of vulnerability records.

3. The system of claim 2 for automatically assessing and mitigating vulnerabilities, wherein the action specified in the policy causes the client device to install an update to address the vulnerability.

4. The system of claim 2 for automatically assessing and mitigating vulnerabilities, wherein the action specified in the policy causes the client device to disable functionality related to the vulnerability.

5. The system of claim 2 for automatically assessing and mitigating vulnerabilities, wherein the action specified in the policy blocks the client device from access to a network resource until an update to address the vulnerability is installed.

6. The system of claim 1 for automatically assessing and mitigating vulnerabilities, wherein the machine-readable instructions that cause the computing device to aggregate the plurality of vulnerability records further cause the computing device to at least:
   scrape one of the plurality of vulnerability records from a respective one of the plurality of vulnerability feeds; and
   parse the scraped one of the plurality of vulnerability records for at least one of a vulnerability severity score, vulnerable application information, or vulnerable device information.

7. The system of claim 1 for automatically assessing and mitigating vulnerabilities, wherein calculating the enterprise-specific severity score for each of the plurality of vulnerability records further comprises causing the computing device to at least repeatedly:
   determine a number of managed devices that are vulnerable to a vulnerability identified in one of the plurality of vulnerability records;
   determine a vulnerability severity score for the vulnerability; and
   multiply the number of managed devices that are vulnerable by the vulnerability severity score to calculate the enterprise-specific severity score.

8. A method for automatically assessing and mitigating vulnerabilities, comprising:
   aggregating a plurality of vulnerability records from a plurality of vulnerability feeds;
   storing the plurality of vulnerability records in a standardized format;
   identifying a client device susceptible to a vulnerability identified by at least one of the plurality of vulnerability records by querying a device record corresponding to the client device and determining that a current version of an application installed on the client device is a vulnerable version of the application based upon the at least one of the plurality of vulnerability records;
   selecting a policy applicable for the at least one of the plurality of vulnerability records; and
   placing the policy in a command queue associated with the client device.

9. The method of claim 8 for automatically assessing and mitigating vulnerabilities, further comprising:
   generating a plurality of enterprise-specific severity scores by calculating an enterprise-specific severity score for each of the plurality of vulnerability records; and
   creating a web page that includes at least a subset of the plurality of enterprise-specific severity scores and respective ones of the plurality of vulnerability records.

10. The method of claim 9 for automatically assessing and mitigating vulnerabilities, wherein the action specified in the policy causes the client device to install an update to address the vulnerability.

11. The method of claim 9 for automatically assessing and mitigating vulnerabilities, wherein the action specified in the policy causes the client device to disable functionality related to the vulnerability.

12. The method of claim 9 for automatically assessing and mitigating vulnerabilities, wherein the action specified in the policy blocks the client device from access to a network resource until an update to address the vulnerability is installed.

13. The method of claim 8 for automatically assessing and mitigating vulnerabilities, wherein aggregating the plurality of vulnerability records further comprises:
   scraping one of the plurality of vulnerability records from a respective one of the plurality of vulnerability feeds; and
   parsing the scraped one of the plurality of vulnerability records for at least one of a vulnerability severity score, vulnerable application information, or vulnerable device information.

14. The method of claim 8 for automatically assessing and mitigating vulnerabilities, wherein calculating the enterprise-specific severity score for each of the plurality of vulnerability records further comprises:
   determining a number of managed devices that are vulnerable to a vulnerability identified in one of the plurality of vulnerability records;
   determining a vulnerability severity score for the vulnerability; and
   multiplying the number of managed devices that are vulnerable by the vulnerability severity score to calculate the enterprise-specific severity score.

15. A non-transitory computer-readable medium comprising machine-readable instructions for automatically assessing and mitigating vulnerabilities that, when executed by a processor, cause a computing device to at least:
   aggregate a plurality of vulnerability records from a plurality of vulnerability feeds;
   store the plurality of vulnerability records in the memory in a standardized format;
   identify a client device susceptible to a vulnerability identified by at least one of the plurality of vulnerability records by querying a device record corresponding to the client device and determining that a current version of an application installed on the client device is a vulnerable version of the application based upon the at least one of the plurality of vulnerability records;
   select a policy applicable for the at least one of the plurality of vulnerability records, wherein the policy specifies an action to be performed by the client device; and
   place the policy in a command queue associated with the client device, wherein the policy can be retrieved by the client device from the command queue.

16. The non-transitory computer-readable medium of claim 15, wherein the machine-readable instructions for automatically assessing and mitigating vulnerabilities, when executed by the processor, further cause the computing device to at least:
   generate a plurality of enterprise-specific severity scores by calculating an enterprise-specific severity score for each of the plurality of vulnerability records; and create a web page that includes at least a subset of the plurality of enterprise-specific severity scores and respective ones of the plurality of vulnerability records.

17. The non-transitory computer-readable medium of claim 16, wherein the action specified in the policy causes the client device to install an update to address the vulnerability.

18. The non-transitory computer-readable medium of claim 16, wherein the action specified in the policy causes the client device to disable functionality related to the vulnerability.

19. The non-transitory computer-readable medium of claim 16, wherein the action specified in the policy blocks the client device from access to a network resource until an update to address the vulnerability is installed.

20. The non-transitory computer-readable medium of claim 15, wherein calculating the enterprise-specific severity score for each of the plurality of vulnerability records further comprises causing the computing device to at least repeatedly:
    determine a number of managed devices that are vulnerable to a vulnerability identified in one of the plurality of vulnerability records;
    determine a vulnerability severity score for the vulnerability; and
    multiply the number of managed devices that are vulnerable by the vulnerability severity score to calculate the enterprise-specific severity score.

* * * * *